United States Patent [19]

Skutnik

[11] Patent Number: 4,511,209

[45] Date of Patent: Apr. 16, 1985

[54] COMPOSITION HAVING IMPROVED OPTICAL QUALITIES

[75] Inventor: Bolesh J. Skutnik, Simsbury, Conn.

[73] Assignee: Ensign-Bickford Industries, Inc., Simsbury, Conn.

[21] Appl. No.: 572,397

[22] Filed: Jan. 20, 1984

Related U.S. Application Data

[63] Continuation-in-part of Ser. No. 352,050, Feb. 24, 1982, abandoned.

[51] Int. Cl.$^3$ .............................................. G02B 5/172
[52] U.S. Cl. ................. 350/96.34; 350/96.15; 350/96.30
[58] Field of Search ............... 350/96.21, 96.29, 96.30, 350/96.15, 96.34

[56] References Cited

U.S. PATENT DOCUMENTS

| | | | |
|---|---|---|---|
| 3,864,229 | 2/1975 | Zapp et al. | 525/350 X |
| 4,120,923 | 10/1978 | Kloker et al. | 521/138 X |
| 4,161,500 | 7/1979 | Schleinitz et al. | 526/329.7 X |
| 4,167,465 | 9/1979 | Zussman et al. | 525/193 X |

Primary Examiner—William L. Sikes
Assistant Examiner—Akm E. Ullah
Attorney, Agent, or Firm—Hayes & Reinsmith

[57] ABSTRACT

Compositions with improved optical qualities, based on highly fluorinated monofunctional acrylates, are cured for use in a wide range of optical articles. The preferred components of the composition are (1) a highly fluorinated monofunctional acrylate; (2) a trifunctional or higher acrylate that serves as a crosslinking agent; (3) a mono or poly-functional thiol that functions as a synergist; and (4) a photoinitiator such as an ultraviolet (UV) initiator. These components can be varied relative to one another over a wide range, but the fluoroacrylate must always be the major component. Where the fluoroacrylate is a solid at room temperature, a small amount of solvent like di-isobutyl ketone or methylene chloride can be added.

20 Claims, No Drawings

COMPOSITION HAVING IMPROVED OPTICAL QUALITIES

BACKGROUND OF THE INVENTION

This application is a continuation in-part of my earlier filed co-pending application, Ser. No. 352,050 filed Feb. 24, 1982 now abandoned.

FIELD OF THE INVENTION

The present invention relates to compositions having improved optical qualities, and more particularly to ultraviolet (UV) curable compositions containing a highly fluorinated monofunctional acrylate as the major component and which produce superior compositions whose improved strength, barrier properties, anti reflective qualities and low attenuation increases with decreasing temperature are useful in a wide range of optical applications such as coatings, signal transmittal cores, fiber claddings and other such uses.

While prior art directed to coatings having improved optical characteristics can be found in many arts, it is believed that the prior art related to claddings and coatings for optical fibers is exceedingly pertinent.

As currently used, the term plastic clad silica (PCS) optical fibers mean a silicone cladding over a fused quartz core. The viscosity and curing requirements of the silicones restrict the production rate to about 0.5 meter/second. The silicone cladding does not adhere well to the quartz, and since it is also soft, the clad fiber is hard to connect. Thermal changes in the fiber's environment can cause a pumping action at the connection, where the quartz core is forced in and out of the clamped cladding. Furthermore, exposing these PCS fibers to low temperatures in the −40° to −50° C. range often yields an attenuation increase of 10-20 dB/km. In many cases, an increase in room temperature attenuation also occurs after thermal cycling. Typical results are given below:

EXAMPLE 1

A 200 μm Suprasil fiber with General Electric 670 silicone resin and a soft urethane jacket (Goodrich 58880)

| Attenuation (dB/km) | | | | |
|---|---|---|---|---|
| Room Temp. | Start | 10.5 | after 3 cycles | 10.9 |
| −46° C. | 1st cycle | 18.6 | 3rd cycle | 20.2 |
| +75° C. | 1st cycle | 9.6 | 3rd cycle | 10.0 |

EXAMPLE 2

Same as above except Dow Corning's Sylard 184 silicone resin is used instead of the General Electric resin

| Attenuation (dB/km) | | | | |
|---|---|---|---|---|
| Room Temp | Start | 10.6 | after 2 cycles | 12.2 |
| −46° C. | 1st cycle | 24.5 | 2nd cycle | 26.6 |
| +75° C. | 1st cycle | 9.0 | 2nd cycle | 10.3 |

Optical fibers have also been made with various UV curable resins as protective coatings. See, for example, U.S. Pat. No. 4,125,644 to Arthur D. Ketley et al and U.S. Pat. No. 4,099,837 to Vazirani. See also Schlef et al, "UV Cured Resin Coaing for Optical Fiber/Cable", Proc. 28th International Wire and Cable Symp., pp. 327-332 (1979), and Vazirani et al, "U.V. Cured Epoxy-Acrylate Coatings on Optical Fibers I. Chemistry and Application", paper TuB3 at the Topical Meeting on Optical Fiber Transmission II, Feb. 22-24, 1977 Williamsburg, Va.

UV curable compositions can be cured quickly into hard, flexible coatings. However, these compositions are normally made up of multifunctional acrylates and other chemicals whose refractive indices range from 1.46 to 1.55, which is above the refractive index for fused quartz, 1.458, at room temperature. To function as an optical fiber cladding, the refractive index of the cladding must be lower than that of the quartz core at all operating temperatures. The refractive index increases as the temperature decreases roughly in proportion to the densification of the material. Quartz has a very low thermal contraction coefficient and thus its refractive index increases much slower than plastics, expecially above the plastics' glass transition temperature.

While other fluorinated polymers have been tried as claddings for optical fibers (see Blyer et al, SPE ANTEC Proc. 23, 383 (1977), it has not heretofore been known to use a fluoroacrylate polymer as a cladding material.

Moreover, it has not heretofore been known to use highly fluorinated monomers as precursors of any type of optical coating. Highly fluorinated monofunctional acrylates have been recommended for textile treatments to increase their resistance to water, oil and grease. The acrylate monomers are usually polymerized in the treated fabric to yield medium molecular weight polymers grafted to the fabric.

SUMMARY OF THE INVENTION

It is therefore a principal object of the present invention to provide a composition having improved optical properties for use in treating a wide range of articles to thereby render them more resistant to moisture and chemicals and to increase their resistance to stress.

It is another object of the present invention to provide an optical article which is manufactured by using at least one layer formed from compositions of varying refractive indices.

It is a further object of the present invention to provide a hard clad optical fiber which exhibits low loss and is temperature stable.

It is another object of this invention to provide a cladding composition for optical fibers which is both optically and mechanically superior to silicone claddings.

It is a further object of the invention to provide a UV curable optical fiber coating having a refractive index lower than that of the quartz core and, being hard, facilitates connections.

Other objects will be in part obvious and in part pointed out in more detail hereinafter.

A better understanding of the objects, advantages, features, properties and relations of the invention will be obtained from the following detailed description which sets forth illustrative embodiments indicative of the various ways in which the principles of the invention are employed.

Principally illustrative of the versatility of the compositions of this invention are hard clad optical fibers that have attenuations often below 10 dB/km and whose temperature behavior is superior to silicone PCS fibers. The numerical aperture (NA) of the fiber, i.e. the measure of the acceptance angle, can be varied by selecting a particular composition. Depending on the quality of the glass core, attenuations in the 4–10 dB/km range are possible.

The main components of the composition for use with a fused silica core are (1) a high fluorinated monofunctional acrylate with a refractive index below 1.38; (2) a trifunctional or higher acrylate that serves as a index below 1.38. By modifying the constituents of the composition, the refractive index of the compositions may be adjusted so that it can be applied to other core or substrate materials to yield clad fibers and other optical articles with a wider range of NA values. The following Table I indicates additional materials which are representative examples of successful combinations of various substrates and coatings utilizing compositions formed in accordance with this invention.

TABLE I

Examples of using other core and substrate materials.

| | | NA using cured film with: | | |
|---|---|---|---|---|
| Substrate Material | $N_D$ | $N_D = 1.41$(a) | $N_D = 1.45$(b) | $N_D = 1.47$(c) |
| Borosilicate crown glass | 1.524 | 0.58 | 0.47 | 0.40 |
| Fused Quartz | 1.458 | 0.37 | 0.15 | — |
| Polystyrene | 1.592 | 0.74 | 0.66 | 0.61 |
| Polymethylmethacrylate | 1.489 | 0.48 | 0.34 | 0.01 |
| Polymethylacrylate | 1.476 | 0.44 | 0.28 | 0.13 |
| Poly 4-methyl, 1-pentene | 1.462 | 0.39 | 0.19 | — |
| Polyethylacrylate | 1.469 | 0.41 | 0.24 | — |
| fluoroacrylate composition of this invention(d) | 1.44 | 0.29 | — | — |

| (a)composition comprises: | | (c)Composition comprises: | |
|---|---|---|---|
| trihydroperfluoroundecylacrylate | 72.1% | nonahydroperfluorodecylacrylate | 50.2% |
| trimethylolpropanetriacrylate | 23.3% | trimethylolpropanetriacylate | 21.0% |
| γ-mercaptopropyltrimethoxysilane | 3.7% | trimethylolpropanetris | 22.5% |
| 2-hydroxy, 2 methyl, 1 phenyl propanone | 0.9% | (3-mercaptoproprionate) | |
| | | 2-hydroxy, 2-methyl, 1 phenyl propanone | 6.4% |
| (b)Composition comprises: | | (d)compositions comprises: | |
| trihydroperfluoroundecylacrylate | 55.1% | trihydroperfluoroundecylacrylate | 60.4% |
| trimethylolpropanetriacrylate | 26.7% | trimethylolpropanetriacrylate | 19.6% |
| γ-mercaptopropyltrimethoxysilane | 8.4% | γ-mercaptopropyltrimethoxysilane | 9.2% |
| 2-hydroxy, 2 methyl, 1 phenyl propanone | 9.8% | 2-hydroxy, 2 methyl, 1 phenyl propanone | 10.8% | crosslinking agent; (3) a mono or polyfunctional thiol that functions as a synergist; and (4) a photoinitiator such as a UV initiator. These components can be varied relative to one another over a wide range, but the fluoroacrylate must always be the major component, i.e. greater than 50% by weight. Where the fluoroacrylate is a solid at room temperature, it is sometimes useful to add a small amount say 5 to 15% by weight, of a solvent like di-isobutyl ketone or methylene chloride.

The compositions according to the invention, when applied to quality fused silica core yield a low loss, temperature stable PCS optical fiber. Since it is possible to tailor the refractive index, the NA of the clad fiber can be adjusted in a wide range, from about 0.1 to 0.4. The compositions of the invention adhere to glass better than silicone and cure faster than silicone. As a result, clad PCS fibers can be produced with faster line speeds, and because the cladding is hard, reliable connections are facilitated.

Additionally, the composition may be used as a cladding material for core or substrate materials other than fused silica or glass and in such an application, the monofunctional acrylate need not have a refractive The refractive index of the monofunctional acrylate, while significant for a quartz core cladding and other low index fiber cores or substrates, it is not pertinent to the more general applications. In the quartz core application, the monofunctional acrylate must have a refractive index below 1.38. The refractive index may vary over a wider range in compositions for other applications.

Additionally, the composition can be used as an antireflective coating on various substrates. Table II illustrates the improved reflectance percentage where a coating composition made in accordance with the invention is applied to a selected substrate material (1) and here two coating compositions with different refractive indices are applied sequentially to selected substrate materials (2). In the dual coating examples the higher index coating is applied directly on the substrate followed by a lower index composition. This property, which reduces reflected energy, allows for the composition to be used on lenses, windows for laser transmittal or other light propagation path components, instrumentation panels, solid state lasers, and other special applications such as solar arrays and the like.

TABLE II

Examples to reflect use of compositions as antireflective coatings on different substrates.

| | | | Reflectance with Coatings | |
|---|---|---|---|---|
| Substrate Material | $N_D$ | Reflectance vs Air % | (1)$N_D$ = 1.39(a) % | (2)$N_D$ = 1.450(c)-first coating $N_D$ = 1.375(b)-second coating % |
| Fused quartz | 1.458 | 3.47 | 2.72 | 2.56 |
| Optical crown glass | 1.523 | 4.30 | 2.87 | 2.62 |
| Borosilicate crown glass | 1.524 | 4.31 | 2.87 | 2.62 |
| Barium-silicate | 1.540 | 4.52 | 2.92 | 2.65 |

TABLE II-continued

Examples to reflect use of compositions as antireflective coatings on different substrates.

| | | | | |
|---|---|---|---|---|
| crown glass | | | | |
| Borate flint glass | 1.569 | 4.91 | 3.03 | 2.71 |
| Heavy flint glass | 1.717 | 6.96 | 3.77 | 3.27 |
| Polystyrene | 1.592 | 5.22 | 3.12 | 2.78 |
| Polymethylmethacrylate | 1.489 | 3.86 | 2.78 | 2.58 |
| Poly 4-methyl-1-pentene | 1.462 | 3.52 | 2.72 | 2.56 |
| Polycarbonate | 1.586 | 5.13 | 3.09 | 2.76 |
| fluoroacrylate composition of this invention(d) | 1.47 | 3.62 | 2.74 | 2.57 |

| (a)composition comprises: | | (c)composition comprises: | |
|---|---|---|---|
| either of trihydroperfluoroheptyacrylate or trihydroperfluoroundecylacrylate | 80.5% | trihydroperfluoroundecylacrylate | 55.1% |
| | | trimethylolpropanetriacrylate | 26.7% |
| trimethylolpropanetriacrylate | 17.0% | γ-mercaptopropyltrimethoxysilone | 10.9% |
| γ-mercaptopropyltrimethoxysilone | 1.0% | 2-hydroxy, 2 methyl, 1 phenyl propanone | 9.8% |
| 2-hydroxy, 2 methyl, 1 phenyl propanone | 1.5% | | |
| (b)Composition comprises: | | (d)Composition comprises: | |
| either of trihydroperfluoroheptyacrylate or trihydroperfluoroundecylacrylate | 87% | nonahydroperfluorodecylacrylate | 50.2% |
| | | trimethylolpropanetriacrylate | 21.0% |
| trimethylolpropanetriacrylate | 6.1% | trimethylolpropanetris | 22.5% |
| γ-mercaptopropyltrimethoxysilone | 3.7% | (3-mercaptoproprionate) | |
| 2-hydroxy, 2 methyl, 1 phenyl propanone | 3.2% | 2-hydroxy, 2 methyl, 1 phenyl propanone | 6.4% |

In contrast to thermoplastic claddings or coatings which must be extruded or solvent-coated onto the fiber core, the compositions of this invention, being fluids, permit dip or spray coating thereby reducing dangers of stress or contamination from extruder equipment or high solvent levels.

The hard clad optical fibers produced using the compositions of the invention have better radiation resistance than glass clad fibers because the fused silica core, which can be used with the compositions of the invention, is the least sensitive type of glass. Compared to glass clad fibers, it is easier to fabricate large core fibers, i.e. greater than 400 μm diameter, with good bending strength. Moreover, it is possible to apply continuous, concentric, thin claddings to even larger diameter fiber cores.

As compared to the optical cladding prior art, especially the Ketley et al and Vazirani patents supra, the major component of the coating composition, according to this invention is a monofunctional monomer. In the preferred form, a monothiol based on a silane is used. Besides the lowered functionality, it represents another class of low odor thiols. Further, the compositions of the invention can be applied at room temperature, even with solid components, by the addition of small amounts of solvents without any detrimental effects on the optical properties. The change in refractive index upon curing is small, 0.02 to 0.03 units, compared to acrylate manufacturers' reported gains of 0.05 to 0.08 units. The use of small amounts of a polyfunctional additive in conjunction with primarily monofunctional monomers and the thiol synergist yields a thermoset with much better thermal stability than a thermoplastic fluoroacrylate.

DETAILED DESCRIPTION OF CERTAIN PREFERRED EMBODIMENTS

Combinations of the four components of the compositions of the invention are chosen in general so as to achieve particular results. For use as an optical fiber cladding with a quartz core the refractive index of the uncured mixture should be lower than 1.42; in practice, the combination is chosen so as to yield a NA for the clad fiber in the range desired for the particular application. General guidelines for each component are set forth below.

The highly fluorinated monofunctional acrylate is one in which the higher of either a minimum of three C-F bonds exist or 25 percent or more of the C-H bonds have been replaced with C-F bonds. Typical compounds have the general formula:

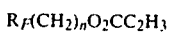

where $R_F = X-(CF_2)_m$, $m = 3-12$, $X = H$ or $F$ and $n = 1, 2 \ldots 3m$

Additionally, the highly fluorinated acrylate compound may include compounds which contain heteroatoms. A specific example is:

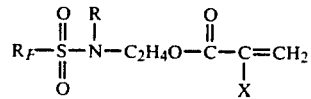

where
$R = CH_3, C_2H_5 \ldots C_4H_9$; $R_F = C_N F_{2N+1}$;
$X = H$ or $CH_3$; and $N = 2$ or more Fluroacrylate mixtures may be used to form the acrylate component percentage of the composition. A specific example is a composition comprising:

| | |
|---|---|
| Fluoroacrylate mixture | 75.6% |
| Trimethylolpropanetriacrylate- | 11.7% |
| mercaptopropyltrimethoxysilane | 5.8% |
| 2-hydroxy, 2-methyl, 1-phenyl propanone | 7.0% | where the Fluoroacrylate mixture, $R_FC_2H_4$ OCOCXCH2 is given as:

| | |
|---|---|
| $R_F = C_8F_{17}$ | 54% |
| $= C_{10}F_{21}$ | 26% |
| $= C_{12}F_{25}$ | 11% |
| $=$ longer than $C_{12}F_{25}$ | 7% |

The polyfunctional acrylate should be trifunctional or higher and for the lowest loss clad fibers should be selected from among the smallest such compounds, as for example trimethylol propane triacrylate.

The thiol synergist can be any of a large number of compounds. The preferred compounds are the esters of mercapto containing acids such as thio-glycolic acid and 2- or 3-mercapto propionic acid esters. The most preferred thiol compounds are thiol containing silanes such as γ-mercaptopropyl trimethoxy silane.

Various photosensitizers and photoinitiators are well-known to those skilled in the art. Of particular interest are the highly reactive compounds such as 2 hydroxy, 3 methyl, 1-phenyl propanone; methyl, ethyl, propyl or isobutyl ethers of benzoin and other analogs, and 2,2-dimethoxy, 2-phenyl-acetophenone.

For the particular application with a fused quartz core, the composition must contain compounds with refractive indices below the following levels:

|  |  |
|---|---|
| Fluoroacrylate | 1.38 |
| Thiol synergist | 1.55 |
| Photoinitiators | 1.55 |

The weight percentage ranges of the four components that satisfy this invention and the preferred ranges are as follows:

|  | Full Range | Preferred Range |
|---|---|---|
| Fluoroacrylate | 50–90% | 60–80% |
| Polyacrylate | 2–35% | 5–25% |
| Thiol/synergist | 0.5–20% | 1–10% |
| Photoinitiator | 0.5–20% | 1–10% |

Table III lists a number of possible compositions and the most significant properties. It is possible to obtain a range of numerical apertures by varying the components, while all silicone clad fibers have a numerical aperture of 0.32–0.33.

TABLE III

| COMPONENTS/COMPOSITION# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Trihydroperfluoroheptylacrylate | 75.6 | — | — | — | — | — | — | — | — | — | — | — | — | — |
| Trihydroperfluoroundecylacrylate | — | 75.6 | 64.8 | 82.0 | 84.4 | 79.5 | 67.3 | 60.4 | 55.1 | 53.4 | 69.6 | 65.6 | 61.8 | 72.1 |
| Trimethylolpropanetriacrylate | 11.7 | 11.7 | 21.0 | 5.9 | 6.1 | 5.7 | 21.8 | 19.6 | 26.7 | 23.0 | 10.7 | 10.2 | 20.0 | 23.3 |
| Trimethylolpropanetris (3-mercaptoproprionate) | 5.8 | — | — | — | — | — | — | — | — | — | — | — | — | — |
| γ-mercaptopropyltrimethoxysilane | — | 5.8 | 6.6 | 5.6 | 2.9 | 5.4 | 6.6 | 9.2 | 8.4 | 10.9 | 5.3 | 5.0 | 6.3 | 3.7 |
| 2-hydroxy, 2-methyl, 1-phenyl propanone | 6.9 | 7.0 | 7.7 | 6.5 | .67 | 9.4 | 4.0 | 10.8 | 9.8 | 12.7 | 6.4 | 6.0 | 7.4 | 0.9 |
| Di-isobutyl ketone | — | — | — | — | — | — | — | — | — | — | 8.0 | — | 4.5 | — |
| Methylene Chloride | — | — | — | — | — | — | — | — | — | — | — | 13.2 | — | — |
| Refractive index of uncured composition | 1.389 | 1.383 | 1.400 | 1.372 | 1.369 | 1.378 | 1.394 | 1.407 | 1.414 | 1.417 | 1.381 | 1.389 | 1.396 | 1.386 |
| Approximate NA of fiber clad with composition | .37 | .39 | .33 | .43 | .44 | .41 | .34 | .30 | .20 | .18 | .39 | .37 | .33 | .38 |

Table IV presents representative data of thermal cycling tests and room temperature attenuations for some compositions used as fiber optic claddings. For comparison, sample results are also given for a few silicone clad fibers. In all these examples the clad fiber is jacketed with a soft urethane, Goodrich 58880, and the optical measurements are made at 820 μm with a launch NA for the light source of 0.25. State of the art techniques well-known in the optical fiber field were used to coat the fiber cores and standard UV lamps at 80 watts/cm were used to cure the fluoroacrylate coatings at speed between 25 to 80 m/min. Use of more powerful lamps would allow even faster speeds, while the use of less powerful lamps would require slower speeds.

TABLE IV

A. Thermal Cycling

| Composition | Temperature | Attenuation (dB/km) | | |
|---|---|---|---|---|
| 3 | Room Temp. | Start | 9.9 | After cycles 9.4 |
|  | −46° C. |  | 12.9 |  |
|  | +75° C. |  | 8.6 |  |
| 12 | Room Temp. | Start | 16.6 | After cycles 14.3 |
|  | −46° C. |  | 14.5 |  |
|  | +75° C. |  | 11.7 |  |
| General Electric RTV-670 | Room Temp. | Start | 10.5 | After cycles 10.9 |
|  | −46° C. |  | 18.6 |  |
|  | +75° C. |  | 9.6 |  |
| Dow Corning- Sylgard 184 | Room Temp. | Start | 10.6 | After cycles 12.2 |
|  | −46° C. |  | 24.5 |  |
|  | +75° C. |  | 9.0 |  |

B. Representative Room Temperature Results

| Composition | Measured NA | Attenuation (dB/km) |
|---|---|---|
| 1 | .37 | 10.7 |
| 2 | .38 | 8.4 |
| 3 | .33 | 9.1 |
| 11 | .37 | 8.0 |
| 12 | .36 | 8.5 |
| 13 | .33 | 8.2 |
| Sylgard 184 | .33 | 8.2 |
| Sylgard 182 | .33 | 9.0 |
| RTV-670 | .33 | 8.1 |

The room temperature data show that the hard clad fibers made with compositions of this invention have comparable attenuation to that achieved with silicone clad fibers. The thermal cycling data clearly demonstrate that the hard clad fibers are much less affected by temperature changes that the silicone clad fibers.

A most important advantage of the invention as it is used as claddings is the enhanced ability to connect the hard clad fibers as compared to silicone clad ones. The hard clad fiber is superior in making terminations and connections. This is attributed to the superior adhesion of the fluoroacrylate cladding to the fused silica core, which means it does not have to be removed when connecting.

Table V presents data on selected physical properties of different cured coatings. Water permeability, water vapor transmission, water absorption and chemical resistance on three standard curable coatings are compared against those measurements for a hard coating composition made in accordance with this invention. The UV curable buffer coating is used as a primary coating or buffer for many glass/glass fibers and is formed of acrylated urethanes and curvatives in a proprietary mixture commonly available from DeSoto, Inc. Similarly, the secondary UV curable coating is formed of the same materials as the buffer coating and available from the above named supplier.

TABLE V

Physical Properties of Cured Coatings

| Coating | Water Permeability(a) | Water Vapor Transmission(b) | Water Absorption(c) | Chemical Resistance(d) methylene chloride/heptane/diisobutyl ketone/toluene |
|---|---|---|---|---|
| Buffer UV Curable (20–25 mil film) | 0.269 | 1.65 | +9.4 | +333/+1.6/+35.5/+109 |
| Secondary UV curable (15–25 mil film) | 0.042 | 0.78 | +3.4 | +58.0/+1.3/+9.0/+22.4 |
| RTV Silicone (30–40 mil film) | 0.162 | 1.11 | +0.1 | +210/+152/+110/+142 |
| Fluoroacrylate(e) Composition of this invention (20–30 mil film) | 0.015 | 0.13 | +0.3 | +8.7/0.0/+3.0/+4.1 |

(a)ng/m.s. Pa @ 30° C. & 50% RH
(b)g/nm² @ 30° C. & 50% RH
(c)% weight change @ 23° C., 24 hours
(d)% weight change @ 23° C., 24 hours
(e)Composition comprises:
Trihydroperfluoroundecylacrylate 73.8%
Trimethylolproponetriacrylate 23.9%
γ-mercaptopropyltrimethoxysilane 1.5%
2-hydroxy, 2-methyl, 1-phenyl propanone 0.9%

The tests demonstrate the improved protective qualities of the composition against water penetration. This fact is most important in protecting glass fibers and glass lenses from developing microcracks and thereby preserving the strength of the articles. These tests additionally demonstrate the susceptibility of the other compositions to chemical attack by common solvents and the improvements allowed by the monofunctional fluoroacrylate composition.

As mentioned above, it is possible to apply continuous, concentric coatings of the composition to a core or other substrate. As an example, a semi-graded index fiber made of multi-layer claddings can be formed. This fiber would be formed by sequentially applying compositions of different refractive indices around the core making certain the highest refractive index composition is applied first, then a lower index composition and so on until the lowest refractive index composition. The advantage of such a composition coated fiber is in increasing the number of data points that may be sent over the fiber for the given distance in a given time interval i.e., to increase the bandwidth. An example of such a semi-graded index fiber is the combination of a glass core with drawn compositions #10, #3, and #14 from Table III. The respective refractive indices for the compositions are 1.417, 1.400 and 1.386. Moreover, the composition itself may be used as the core material with lower refractive index compositions drawn about the core composition. Additionally, continuous, multi-layer coatings can be applied to other optical articles such as lenses and the like.

The other advantages over silicone PCS fibers include the increases possible in processing over a silicone cladding. Here the fluoroacrylate cladding composition can be easily applied and cured at 40–80 meters/min with 80 watts/cm UV lamps, whereas the silicone cladding rarely can be applied and cured above 25 meters/min.

As will be apparent to persons skilled in the art, various modifications, adaptations and variations of the foregoing specific disclosure can be made without departing from the teachings of this invention.

I claim:

1. A cladding composition for plastic clad silica optical fibers comprising
   a highly fluorinated monofunctional acrylate with a refractive index below 1.38 and constituting more than 50% by weight of the composition,
   a polyfunctional acrylate being trifunctional or higher serving as a crosslinking agent,
   a mono or polyfunctional thiol that functions as a synergist, and
   a photoinitiator.

2. The composition according to claim 1 wherein said highly fluorinated monofunctional acrylate comprises 50 to 90% by weight, said polyfunctional acrylate comprises 2.0 to 35% by weight, said thiol synergist comprises 0.5 to 20% by weight, and said photoinitiator comprises 0.5 to 20% by weight.

3. The composition according to claim 1 wherein said highly fluorinated monofunctional acrylate comprises 60 to 90% by weight, said polyfunctional acrylate comprises 5 to 25% by weight, said thiol synergist comprises 1 to 10% by weight, and said photoinitiator comprises 0.9 to 10% by weight.

4. The composition according to claims 1, 2 or 3 wherein said highly fluorinated monofunctional acrylate has the general formula:

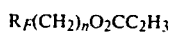

$$R_F(CH_2)_nO_2CC_2H_3$$

where $R_F = X-(CF_2)_m$, m = 3–12, X = H or F, and n = 1, 2 ... 3m.

5. The composition according to claims 1, 2 or 3 wherein said highly fluorinated monofunctional acrylate is trihydroperfluoroundecylacrylate, said polyfunctional acrylate is trimethylolpropanetriacrylate, and said thiol synergist is γ-mercaptopropyltrimethoxysilane.

6. The composition according to claims 1, 2 or 3 wherein said highly fluorinated monofunctional acrylate is trihydroperfluoroheptylacrylate, said polyfunctional acrylate is trimethylolpropanetriacrylate, and said thiol synergist is trimethylolpropanetris 3-mercaptoproprionate.

7. A plastic clad silica optical fiber comprising
   a fused silica core, and an ultraviolet cured cladding composition which includes a mixture of a highly fluorinated monofunctional acrylate with a refractive index below 1.38 and constituting more than 50% by weight of the composition, a trifunctional or higher acrylate serving as a crosslinking agent, mono or polyfunctional thiol that functions as a synergist, and an ultraviolet initiator.

8. A composition having improved optical qualities, said composition comprising
   (a) a highly fluorinated monofunctional acrylate constituting more than 50% by weight of the composition;
   (b) a polyfunctional acrylate being trifunctional or higher serving as a crosslinking agent;
   (c) a mono or polyfunctional thiol that functions as a synergist; and
   (d) an photoinitiator.

9. The composition according to claim 8 wherein said highly fluorinated monofunctional acrylate comprises 50 to 90% by weight, said polyfunctional acrylate comprises 2.0 to 35% by weight, said thiol synergist comprises 0.5 to 20% by weight, and said photoinitiator comprises 0.5 to 20% by weight.

10. The composition according to claim 8 wherein said highly fluorinated monofunctional acrylate comprises 60 to 90% by weight, said polyfunctional acrylate comprises 5 to 25% by weight, said thiol synergist comprises 1 to 10% by weight, and said photoinitiator comprises 0.9 to 10% by weight.

11. The composition of claim 8, 9 or 10 wherein said highly fluorinated monofunctional acrylate has a refractive index below 1.38.

12. The composition according to claims 8, 9 or 10 wherein said highly fluorinated monofunctional acrylate has the general formula:

$$R_F(CH_2)_nO_2CC_2H_3$$

where $R_F = X-(CF_2)_m$, $m = 3-12$, $X = H$ or $F$, and $n = 1, 2 \ldots 3m$.

13. The composition according to claims 8, 9 or 10 wherein said highly fluorinated monofunctional acrylate has the general formula:

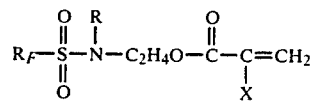

where
$R = CH_3, C_2H_5 \ldots C_4H_9$
$R_F = C_N F_{2N+1}$
$X = H$ or $CH_3$; and
$N = 2$ or more.

14. The composition according to claims 8, 9 or 10 wherein said highly fluorinated monofunctional acrylate is trihydroperfluoroundecylacrylate, said polyfunctional acrylate is trimethylolpropanetriacrylate, and said thiol synergist is γ-mercaptopropyltrimethoxysilane.

15. The composition according to claims 8, 9 or 10 wherein said highly fluorinated monofunctional acrylate is trihydroperfluoroheptylacrylate, said polyfunctional acrylate is trimethylolpropanetriacrylate, and said thiol synergist is trimethylolpropanetris 3-mercaptoproprionate.

16. An optical fiber comprising:
   (a) a core, and
   (b) an ultraviolet cured composition which includes a mixture of a highly fluorinated monofunctional acrylate and constituting more than 50% by weight of the composition, a trifunctional or higher acrylate serving as a crosslinking agent, a mono or polyfunctional thiol that functions as a synergist, and a photoinitiator.

17. The optical fiber of claim 16 wherein said composition includes a highly fluorinated monofunctional acrylate with a refractive index below 1.38.

18. The optical fiber of claim 16 wherein said core is a fused silica core.

19. An optical article comprising
   (a) a substrate; and
   (b) at least one layer of a cured composition having a variable refractive index and being layered in decreasing refractive index order from said substrate, said compositions includes a mixture of a highly fluorinated mono functional acrylate constituting more than 50% by weight of the composition, a trifunctional or higher acrylate serving as a crosslinking agent, a mono or polyfunctional thiol that functions as a synergist and an ultraviolet photoinitiator.

20. The optical article of claim 19 further comprising said substrate being made of said cured composition.

* * * * *

UNITED STATES PATENT AND TRADEMARK OFFICE
CERTIFICATE OF CORRECTION

PATENT NO. : 4,511,209
DATED : April 16, 1985
INVENTOR(S) : Bolesh J. Skutnik

It is certified that error appears in the above—identified patent and that said Letters Patent is hereby corrected as shown below:

Column 4, line 49 wherein the word "here" should read --where--.

Table II, wherein the word " -mercaptopropyltrimethoxysilone" should read -- -mercaptopropyltrimethoxysilane--.

Column 8, line 32 wherein the word "that" should read --than--.

Table V, line 2 of footnotes reads "g/nm$^2$@ 30°C & 50% RH" should read --g/hm$^2$@ 30°C & 50% RH.

Signed and Sealed this

Twenty-second Day of October 1985

[SEAL]

Attest:

Attesting Officer

DONALD J. QUIGG

Commissioner of Patents and
Trademarks—Designate